(12) United States Patent
Lin et al.

(10) Patent No.: US 6,518,750 B1
(45) Date of Patent: Feb. 11, 2003

(54) ANGULAR POSITION SENSOR INCLUDING ROTOR WITH SPACED BAR MAGNETS

(75) Inventors: Yingjie Lin, El Paso, TX (US); Warren Baxter Nicholson, El Paso, TX (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/636,014

(22) Filed: Aug. 10, 2000

(51) Int. Cl.⁷ .............................. G01B 7/30; G01D 5/14
(52) U.S. Cl. .............................. 324/207.2; 324/207.22; 324/207.25
(58) Field of Search .................. 324/207.2–207.25, 324/174; 310/68 B, 156.07, 156.11, 156.25, DIG. 3; 73/DIG. 3; 318/653; 123/406.52, 406.58, 617

(56) References Cited

U.S. PATENT DOCUMENTS

| | | | |
|---|---|---|---|
| 3,188,620 A | * 6/1965 | MacCallum | 324/174 X |
| 3,194,990 A | * 7/1965 | Kendall | 324/207.2 X |
| 3,342,070 A | * 9/1967 | Walch, Jr. | 324/174 X |
| 3,406,775 A | * 10/1968 | Magnuski | 324/174 X |
| 4,392,375 A | * 7/1983 | Eguchi et al. | 324/207.21 |
| 4,789,826 A | * 12/1988 | Willett | 324/207.2 |
| 5,544,000 A | * 8/1996 | Suzuki et al. | 324/207.2 X |
| 5,825,178 A | * 10/1998 | Hipp et al. | 324/207.2 |
| 5,861,745 A | * 1/1999 | Herden | 324/207.2 |
| 6,137,288 A | * 10/2000 | Luetzow | 324/207.21 X |
| 6,201,389 B1 | * 3/2001 | Apel et al. | 324/207.2 |
| 6,218,828 B1 | * 4/2001 | Bates et al. | 324/207.2 |

FOREIGN PATENT DOCUMENTS

| | | |
|---|---|---|
| DE | 3826408 C2 | 9/1991 |
| DE | 4123131 A1 | 1/1993 |
| DE | 19630764 A1 | 4/1997 |
| DE | 19716985 A1 | 10/1998 |
| JP | 2-122205 | * 5/1990 |

OTHER PUBLICATIONS

Equizabal, Antonio L. "Hall–effect Tachometer Senses Speed, Direction of Rotation," Electronics vol. 53, No. 19, pp 176–177, Aug. 28, 1980.*

* cited by examiner

*Primary Examiner*—Gerard R. Strecker
(74) *Attorney, Agent, or Firm*—Margaret A. Dobrowitsky

(57) ABSTRACT

An angular position sensor includes a rotor attached to a shaft. A first magnet and a second magnet are attached to the surface of the rotor. Moreover, a first concentrator and a second concentrator are disposed around the perimeter of the rotor opposite each other. A space is established between the first concentrator and second concentrator, and a magnetic field sensing element is disposed in the space. As the rotor rotates with respect to the sensing element, the sensing element outputs a linear signal representing the location of the rotor with respect to the sensing element over a range between negative ninety degrees and positive ninety degrees.

16 Claims, 4 Drawing Sheets

ANGULAR POSITION SENSOR INCLUDING ROTOR WITH SPACED BAR MAGNETS

TECHNICAL FIELD

The present invention relates generally to angular position sensors.

BACKGROUND OF THE INVENTION

Some motor vehicle control systems require angular position sensors that need only sense partial angular motion of one part relative to another part, e.g., less than plus or minus ninety degrees (+/−90°). Shaped magnets have been used in conjunction with magnetic field sensors in order to provide non-contact angular position sensors that sense partial angular motion. It happens that angular position sensors utilizing rotating magnets sensed by stationary magnet field sensors produce a sinusoidal or pseudo-sinusoidal output signal that merely approximates a linear output signal. As a result, as recognized the present invention, these sensors have limited accuracy.

Resistance-strip position sensors have also been widely used to determine the position of a moving part relative to a corresponding stationary part. The present invention understands that these traditional sensors can have reliability problems due to the susceptibility of the resistance-strips to premature wear. Moreover, the vibration of contact brushes along the resistance-strips can cause unacceptable electrical noise in the output signals.

The present invention has recognized these prior art drawbacks, and has provided the below-disclosed solutions to one or more of the prior art deficiencies.

SUMMARY OF THE INVENTION

An angular position sensor includes a rotor. A first magnet is attached to the surface of the rotor, and a second magnet is attached to the surface of the rotor opposite the first magnet. Additionally, a first concentrator is disposed around the perimeter of the rotor and a second concentrator is disposed around the perimeter of the rotor opposite the first concentrator such that a space is established between the first concentrator and the second concentrator. A magnetic field sensing element is disposed in the space established between the first concentrator and the second concentrator.

In a preferred embodiment, the magnetic field sensing element is a Hall sensor. Preferably, the rotor is coupled to a rotating element and the first concentrator and second concentrator are stationary with respect to the rotor.

In one aspect of the present invention, each magnet defines an inner pole and an outer pole. The width of the outer pole is greater than the width of the inner pole. Moreover, the concentrators are arc-shaped and span an angle of approximately one hundred and thirty degrees.

In another aspect of the present invention, each magnet defines an inner pole width and an outer pole width. The inner pole width is equal to the outer pole width. In this aspect of the present invention, each magnet has a length that is at least two times greater than the inner pole width and outer pole width. Moreover, the concentrators are arc-shaped and span an angle of approximately ninety degrees.

In yet another aspect of the present invention, a vehicle control system includes a microprocessor and an angular position sensor electrically coupled to the microprocessor. The sensor provides a linear signal to the microprocessor that represents angular motion in a range between negative ninety degrees and positive ninety degrees.

The present invention will now be described, by way of example, with reference to the accompanying drawings, in which:

DESCRIPTION OF AN EMBODIMENT OF THE INVENTION

Figure 1:
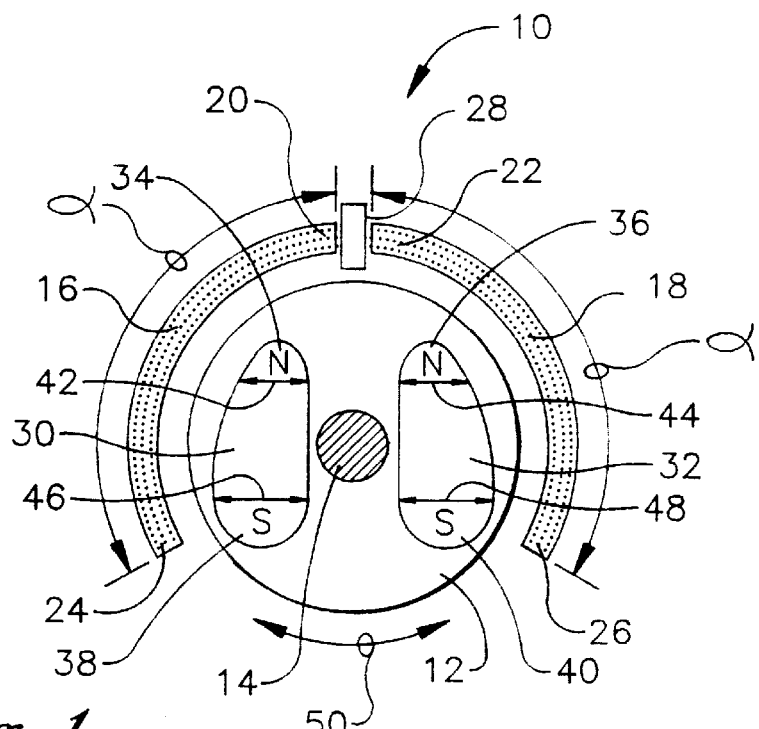
FIG. 1 is a top plan view of an angular position sensor.

Referring initially to FIG. 1, an angular position sensor is shown and generally designated 10. FIG. 1 shows a generally disk-shaped, preferably non-magnetic rotor 12 connected to a shaft 14. It is to be appreciated that the rotor 12 can be connected to the shaft 14 directly, as shown, or indirectly via one or more gears (not shown). FIG. 1 shows a generally arc-shaped, first concentrator 16 and a generally arc-shaped, second concentrator 18 and each defines a proximal end 20, 22 and a distal end 24, 26. In a preferred embodiment, the concentrators 16, 18 are made from a soft magnetic material, and as shown in FIG. 1, the concentrators 16, 18 are placed around the perimeter of the rotor 12 such that the proximal ends 20, 22 of the concentrators 16, 18 are in close proximity to each other, but not touching. A magnetic field sensing element 28, e.g., a Hall sensor, is placed in the space established between the proximal ends 20, 22 of the concentrators 16, 18. In a preferred embodiment, as shown in FIG. 1, each arc-shaped concentrator 16, 18 spans an angle, α, that is greater than ninety degrees (90°), but less than one hundred and eighty degrees (180°).

Referring still to FIG. 1, a first permanent magnet 30 and a second permanent magnet 32 are attached to the surface of the rotor 12. It is to be appreciated that the magnets 30, 32 may be insert molded into the rotor 12 or otherwise attached to the rotor 12 such that they are carried by the rotor 12. FIG. 1 shows that the magnets 30, 32 are teardrop-shaped, generally oblong structures that are mirror images of each other and are oriented on the surface of the rotor 12 in identical positions opposite each other. As shown in FIG. 1, each magnet 30, 32 defines an inner pole 34, 36 and an outer pole 38, 40. It is to be understood that the inner poles 34, 36 are closer to the sensing element 18 than the outer poles 38, 40. Moreover, each inner pole 34, 36 has a width 42, 44 and each outer pole 38, 40 has a width 46, 48. In a preferred embodiment, the widths 46, 48 of the outer poles 38, 40 are larger than the widths 42, 44 of the inner poles 34, 36.

Figure 2:
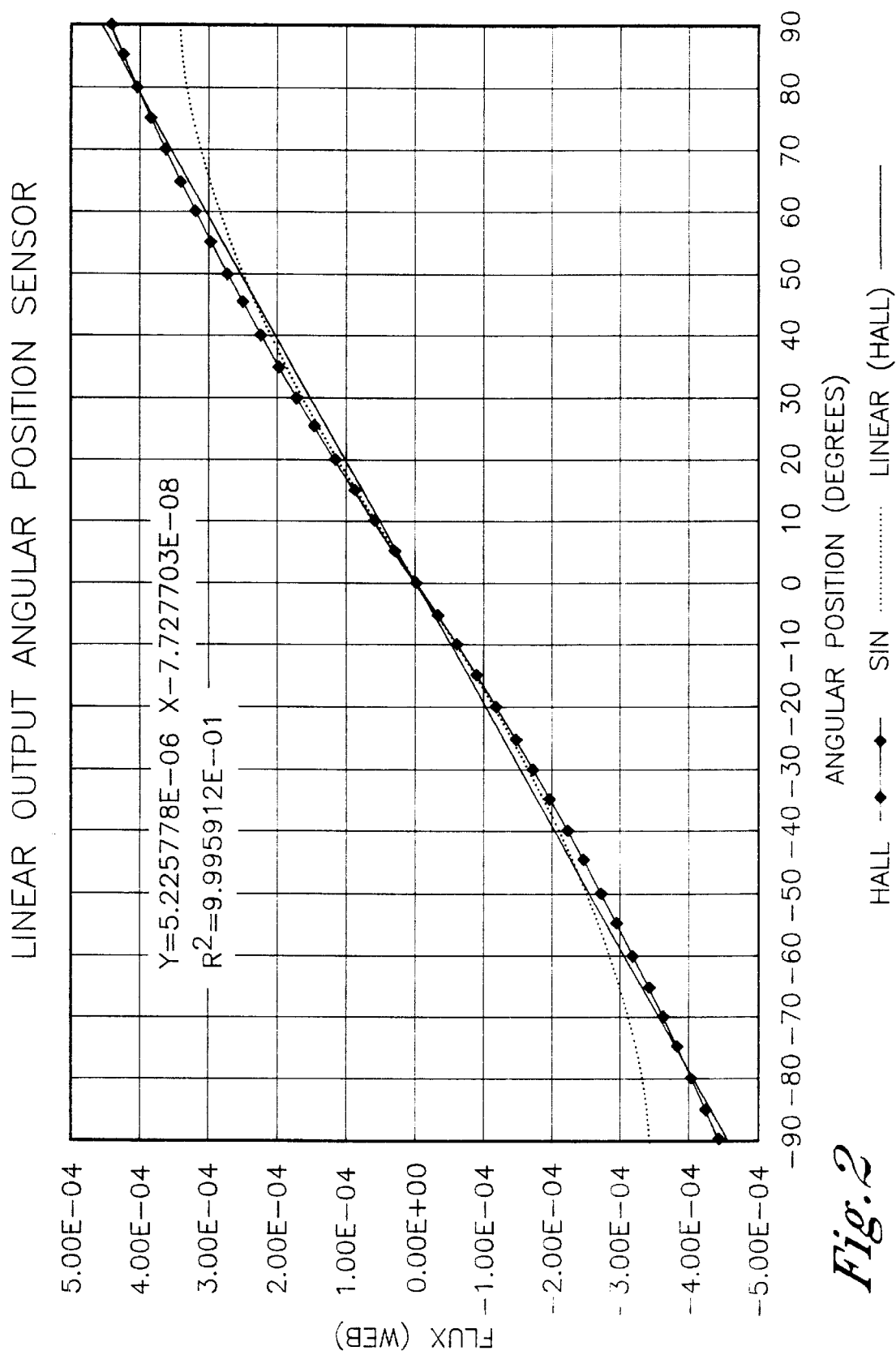
FIG. 2 is a graph of the output of the angular position sensor shown in FIG. 1.

It is to be understood that as the rotor 12 rotates in either direction with respect to the concentrators 16, 18, as indicated by motion arc 50, the angle of magnetic flux from each magnet reaching the sensing element 28 varies. The concentrators 16, 18 collect and conduct magnetic flux around the concentrators 16, 18 and through the sensing element 28. The output of the sensing element 28 varies as shown in FIG. 2. With the structure described above, i.e., the size and shape of the magnets 30, 32 and the angles spanned by the concentrators 16, 18, the output of the sensing element 28 is linear from approximately negative eighty five degrees to approximately positive eight five degrees (−85° to +85°) as measured from the zero position shown in FIG. 1. It is to be appreciated that the magnets 30, 32 can be toed in or toed out to adjust the linearity of the angular position sensor 10.

Figure 3:
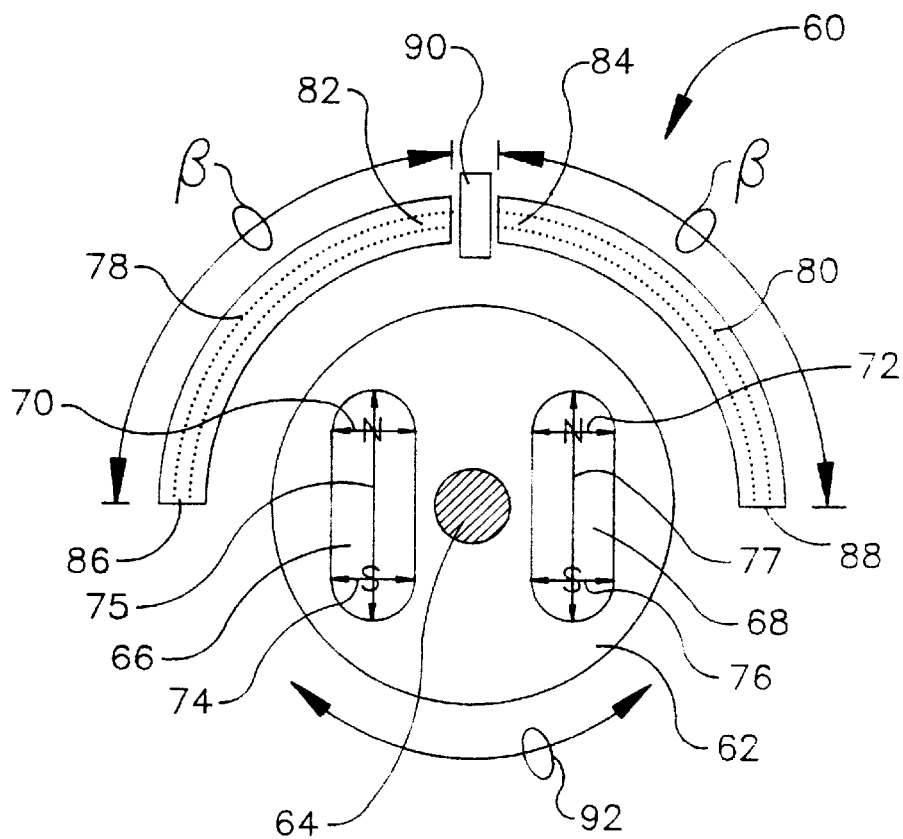
FIG. 3 is a top plan view of an alternative angular position sensor.

Referring now to FIG. 3, an alternative embodiment of the angular position sensor is shown and generally designated 60. FIG. 3 shows that the angular position sensor 60 includes a rotor 62 that is connected to a shaft 64. Attached to the rotor 62 is a first permanent magnet 66 and a second permanent magnet 68. In this embodiment, each magnet 66, 68 is generally racetrack shaped and has an inner pole width 70, 72 that is equal to the outer pole width 74, 76. It is to be understood that the inner pole widths 70, 72 are the widths of the magnets 66, 68 at the ends of the magnets 66, 68 closest to the magnetic field sensing element, described below. Moreover, each magnet 66, 68 has a length 75, 77 that is at least two times greater than inner and outer pole widths 70, 72, 74, 76.

FIG. 3 shows a generally arc-shaped, first concentrator 78 and a generally arc-shaped, second concentrator 80. Each concentrator 78, 80 defines a proximal end 82, 84 and a distal end 86, 88. As shown in FIG. 3, the concentrators 78, 80 are placed around the perimeter of the rotor 62 such that the proximal ends 82, 84 of the concentrators 78, 80 are in close proximity to each other, but not touching. A magnetic field sensing element 90, e.g., a Hall sensor, is placed in the space established between the proximal ends 82, 84 of the concentrators 78, 80. In this embodiment of the angular position sensor 60, each arc-shaped concentrator 78, 80 spans an angle, β, that is approximately ninety degrees (90°). It is to be appreciated that the angle, β, can be greater than ninety degrees (90°), but not greater than one hundred and eighty degrees (180°).

Figure 4:
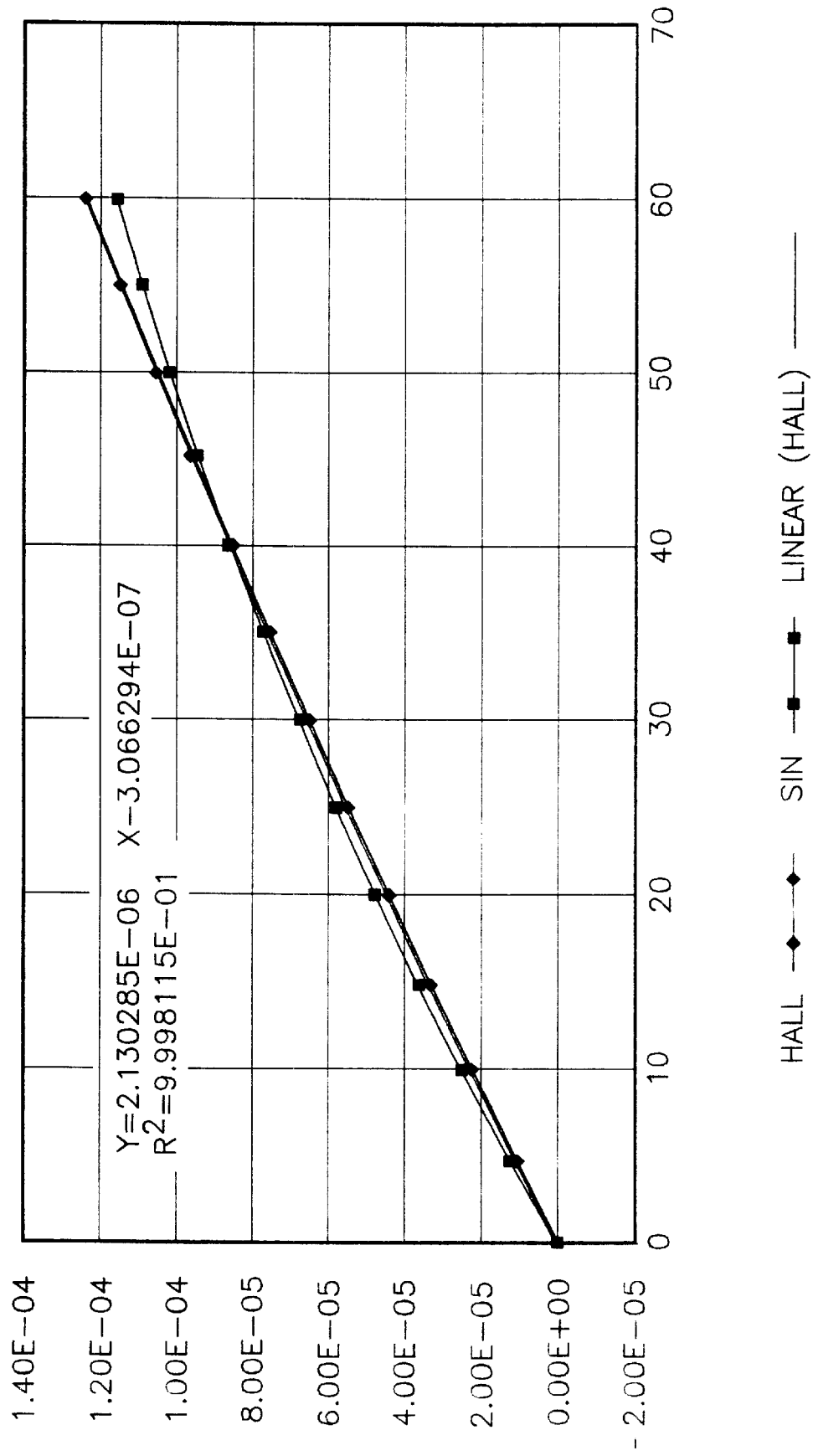
FIG. 4 is a graph of the output of the alternative angular position sensor shown in FIG. 2.

It is to be understood that as the rotor 62 rotates in either direction with respect to the concentrators 78, 80, as indicated by motion arc 92, the angle of magnetic flux from each magnet reaching the sensing element 90 varies. The output of the sensing element 90 varies as shown in FIG. 4. With the structure described above, i.e., the size and shape of the magnets 66, 68 and the angles, β, spanned by the concentrators 78, 80, the output of the sensing element 90 is linear from zero degrees to approximately sixty degrees (0° to 60°). It is to be appreciated that the output of the sensor from zero degrees to approximately negative sixty degrees (0° to −60°), not shown in FIG. 4, is also linear.

Figure 5:
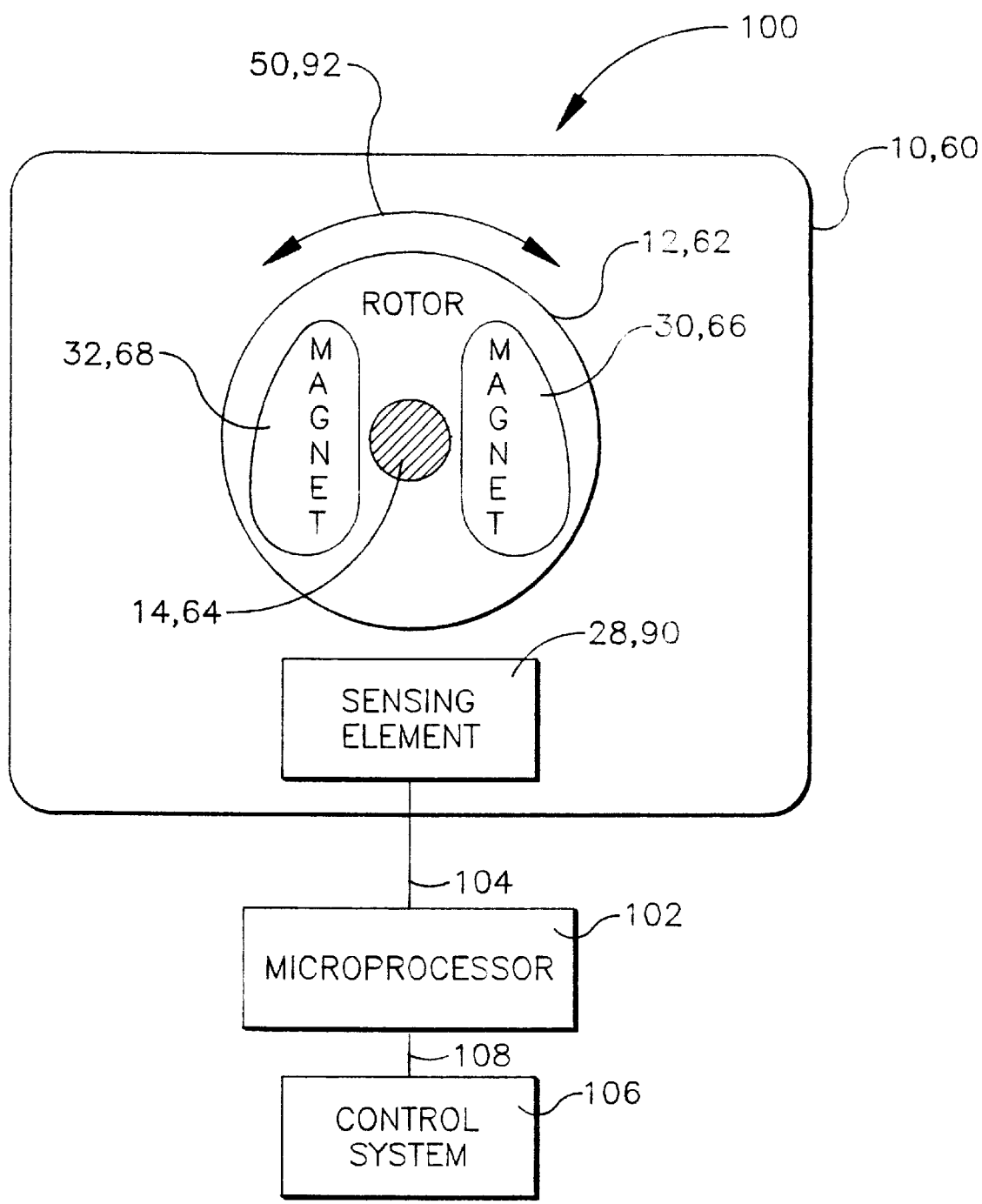
FIG. 5 is a block diagram of an exemplary vehicle system in which the angular position sensor is installed.

Referring now to FIG. 5, a block diagram representing a vehicle control system is shown and generally designated 100. FIG. 5 shows that the vehicle control system 100 includes the angular position sensor of the present invention, e.g., the sensor 10 shown in FIG. 1, electrically connected to a microprocessor 102 or equivalent circuit via an electrical line 104. Specifically, the sensing element 28 is connected to the microprocessor 102 via the electrical line 104. A control system 106 is electrically coupled to the microprocessor 102 by an electrical line 108. As the rotor 12 turns the sensing element 28 provides a signal to the microprocessor 102. This signal is then processed by the microprocessor 102 to determine the position of the rotor 12 relative to the sensing element 28 in accordance with the principles above. It is to be understood that the sensor 60 shown in FIG. 3 can be used in the control system 100.

With the configuration of structure described above, it is to be appreciated that the angular position sensor 10, 60 can be used to sense angular motion of one part with respect to another part, without contact between the parts, over a predetermined range while providing relatively accurate linear output over the predetermined range.

While the particular angular position sensor as herein shown and described in detail is fully capable of attaining the above-described objects of the invention, it is to be understood that it is the presently preferred embodiment of the present invention and thus, is representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it is to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. section 112, sixth paragraph, unless the element is expressly recited using the phrase "means for."

What is claimed is:

1. An angular position sensor comprising:
   a rotor defining an upper surface and a center;
   a first bar magnet attached to the upper surface of the rotor;
   a second bar magnet attached to the upper surface of the rotor, the first magnet and second magnet being positioned on the upper surface of the rotor such that they are equally spaced from the center of the rotor and parallel to each other;
   a first concentrator disposed around the perimeter of the rotor;
   a second concentrator disposed around the perimeter of the rotor such that a space is established between respective ends of the first concentrator and the second concentrator; and
   a magnetic field sensing element disposed in the space established between the first concentrator and the second concentrator.

2. The sensor of claim 1, wherein the magnetic field sensing element is a Hall sensor.

3. The sensor of claim 1, wherein the rotor is coupled to a rotating element and the first concentrator and second concentrator are stationary with respect to the rotor.

4. The sensor of claim 1, wherein each magnet defines an inner pole and an outer pole and the width of the outer pole is greater than the width of the inner pole, the inner poles being closer to the sensing element than the outer poles.

5. The sensor of claim 4, wherein the concentrators are arc-shaped and span an angle of at least ninety degrees.

6. The sensor of claim 1, wherein each magnet defines an inner pole width and an outer pole width, the inner pole width being equal to the outer pole width, the inner pole width being closer to the sensing element than the outer pole width.

7. The sensor of claim 6, wherein each magnet has a length that is at least two times greater than the inner pole width and outer pole width.

8. The sensor of claim 7, wherein the concentrators are arc-shaped and span an angle of approximately ninety degrees.

9. A position sensing system comprising:

a microprocessor; and an angular position sensor electrically coupled to the microprocessor, the sensor providing a signal to the microprocessor representing angular position of a rotating element in a range between negative ninety degrees and positive ninety degrees relative to a single sensing element, wherein the angular position sensor includes:

at least two bar magnets attached to an upper surface of a rotor that defines a center, the magnets being equally spaced from the center of the rotor and parallel to each other;

a first concentrator disposed around the perimeter of the rotor;

a second concentrator disposed around the perimeter of the rotor such that a space is established between respective ends of the first concentrator and the second concentrator; and a magnetic field sensing element disposed in the space established between the first concentrator and the second concentrator.

10. The system of claim 9, wherein the magnetic field sensing element is a Hall sensor.

11. The system of claim 10, wherein the rotor is coupled to a rotating element and the first concentrator and second concentrator are stationary with respect to the rotor.

12. The system of claim 9, wherein each magnet defines an inner pole and an outer pole and the width of the outer pole is greater than the width of the inner pole, the inner poles being closer to the sensing element than the outer poles.

13. The system of claim 12, wherein the concentrators are arc-shaped and span an angle of at least ninety degrees.

14. The system of claim 9, wherein each magnet defines an inner pole width and an outer pole width, the inner pole width being equal to the outer pole width, the inner pole width being closer to the sensing element than the outer pole width.

15. The system of claim 14, wherein each magnet has a length that is at least two times greater than the inner pole width and outer pole width.

16. The system of claim 15, wherein the concentrators are arc-shaped and span an angle of ninety degrees.

* * * * *